Patented Mar. 26, 1929.

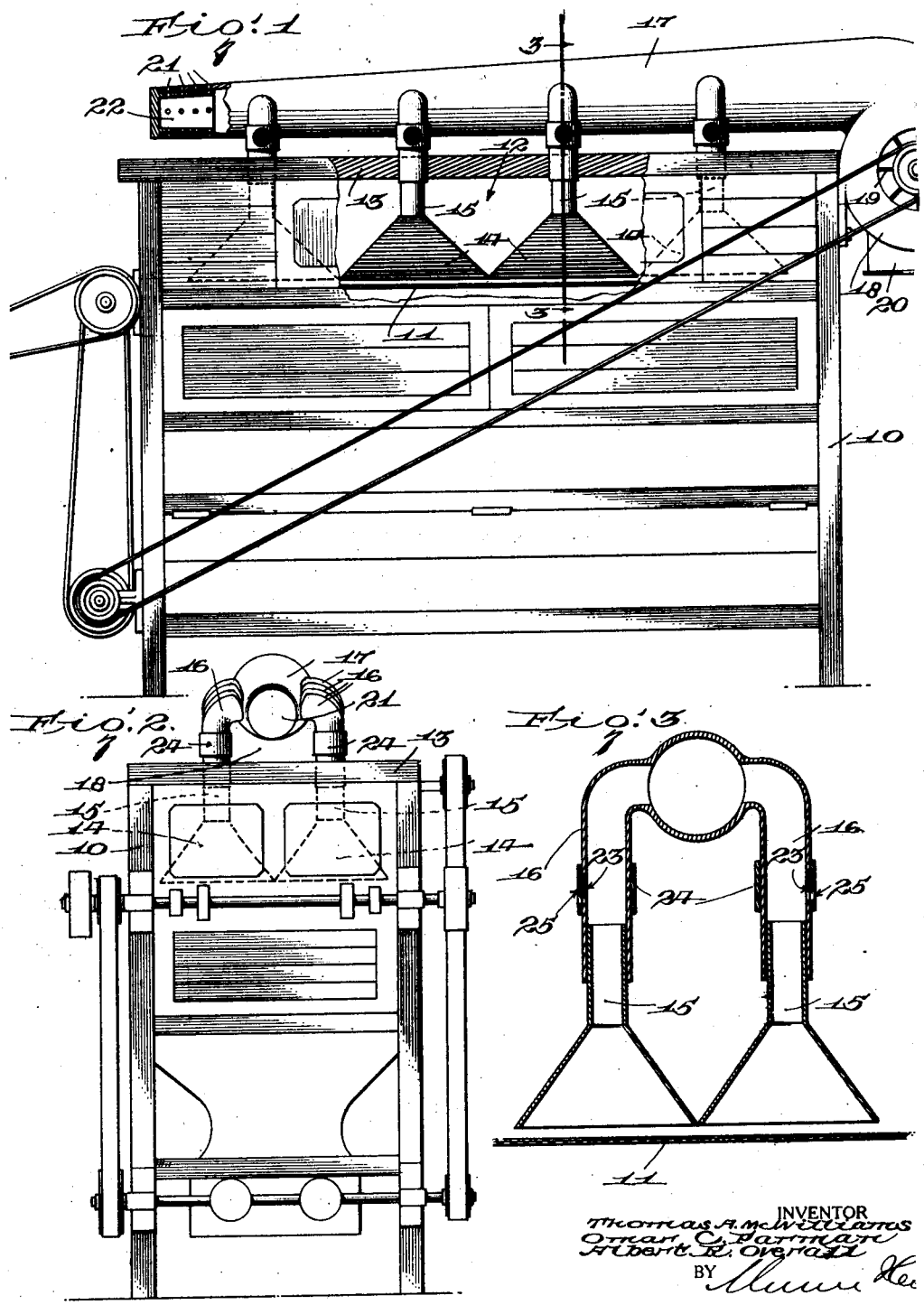

1,706,800

UNITED STATES PATENT OFFICE.

THOMAS A. McWILLIAMS, OMER C. PARMAN, AND ALBERT R. OVERALL, OF NASHVILLE, TENNESSEE, ASSIGNORS TO F. M. FARRIS, OF NASHVILLE, TENNESSEE.

ATTACHMENT FOR GRAIN PURIFIERS.

Application filed November 17, 1925. Serial No. 69,683.

Our present invention relates generally to purifiers as used in flour mills and the like for withdrawing specks and various forms of impurities from grain, that is middlings and the like, and our invention has for its primary object the provision of a suction purifier which may be readily and easily adapted and installed in connection with various forms and sizes of grain purifiers of that nature in which the grain is carried through from the rolls upon a cloth apron.

A further object of our invention is the provision of an attachment which may be adapted as above described, and which will effectively and efficiently operate to withdraw impurities from grain with the least possible loss of grain or useful portion of the stock through the attachment to the dust collector.

In the accompanying drawing which illustrates our present invention and forms a part of this specification, Figure 1 is a side view, partly in elevation and partly in section illustrating the practical application of our invention, Figure 2 is a front elevation thereof, and Figure 3 is an enlarged detail transverse section taken through our improved attachment substantially on the line 3—3 of Figure 1.

Referring now to these figures, and particularly to Figures 1 and 2, we have shown in a general way at 10 a conventional grain purifier of that type wherein the grain passes through upon a cloth apron 11, there being usually a considerable space 12 between such cloth apron and the top 13 of the casing or cabinet of the purifier.

Our improved attachment essentially includes a series of downwardly flaring and downwardly opening suction hoods 14, preferably arranged with their adjacent edges in contacting relation so as to cover substantially the entire area of the apron, and arranged in number therefore depending to a considerable extent upon the size of the purifier or rather the apron 11 within the purifier above which the hoods are disposed.

Each of the hoods is in open communication with an upstanding tube 15 attached thereto, and the upper portion of each tube 15 is disposed in telescoping adjustable relation within the lower open end of a tubular hood supporting member 16 whose lower end is preferably mounted in an opening through the top 13 of the cabinet of the purifier.

The several tubular hood supports 16 depend from and are in communication with a suction line 17, the latter communicating at one end with a fan casing 18 having therein a fan 19 and discharging through an outlet pipe 20 into a suitable dust collector as in ordinary practice. The suction line 17 may, as shown, be in the form of an enlarged pipe having at its end opposite the fan casing 18 series of apertures 21 with which an apertured valve member 22 telescoping the respective ends of the pipe, cooperates. The turning of this valve member to more or less register its apertures with the apertures 21 of the suction pipe, controls the suction through the several tubular hood supports 16.

Moreover, each hood support 16 has an opening 23 therein, and a collar 24 surrounding the same with an opening 25 to more or less register with the opening 23, so that while the valve member 22 simultaneously controls suction in the several tubular hood supports, the rotating valve collars 24 cooperating with the openings 23 individually control suction through the several suction hoods 14.

In this way desired delicate control may be had throughout the series of suction hoods, varying from a relatively strong suction at the outgoing side of the purifier to a comparatively weak suction at the incoming side.

By virtue of the telescoping adjustment of the several upstanding tubes 16, the hoods 14 may be raised and lowered so as to control and regulate the space between the hoods and the grain carrying apron 11 within the purifier and permit the lower open ends of the hoods to be positioned closely adjacent to the apron as is necessary in successfully purifying middlings and the like, where it is of primary importance to withdraw the impurities with as little of the flour as possible. Figures 1 and 3 show the close relation of the hood mouths to the apron so that each hood individually draws air upwardly through the apron.

Our improved attachment may be readily and easily installed as is quite obvious, and will effectively and efficiently operate in practice to withdraw various impurities from

What we claim is:

1. In a grain purifier, a suction pipe, a plurality of tubular members depending from and in communication with the said suction pipe, a plurality of downwardly flaring suction hoods opening downwardly in close proximity to said screen cloth and, each having an upstanding tube telescoping and adjustable in one of the said tubular hood supports, a regulable air valve in the intake end of the suction pipe to control the suction communicated to said tubular hood supports, each of said tubular hood supports having an opening, and an apertured collar around each of the tubular hood supports, coacting with the opening thereof to form an air valve for individually controlling the suction through the respective hoods supported thereby.

2. An attachment for grain purifiers, including a series of downwardly flaring and downwardly opening suction hoods, a suction pipe having a plurality of tubular connecting members extending over said pipe at spaced points there along said hoods having means adjustably engaging said connecting members and adapted when in connection therewith to lie closely adjacent to one another, an air controlling valve in the suction pipe, and an independently controlled regulable air valve in each of said tubular connections cooperable with the suction pipe and valve.

3. An attachment for grain purifiers of the type employing a horizontal screen cloth, said attachment comprising a suction chamber and suction means therein and adapted for attachment at one end of the purifier, a suction pipe extending from said chamber over said screen cloth, a series of tubular supports extending downwardly from the suction tube, a series of downwardly flaring and opening suction hoods telescopically adjustable in said tubular supports and disposed in close proximity to the screen of the purifier, a variable air valve at the end of the suction pipe remote from the suction means, and a variable air valve in each of said tubular hood supports, as and for the purpose described.

4. An attachment for purifiers and a cloth screen therein on which the grain moves, a suction pipe secured at one end of the purifier and extending thereover, suction means at one end of the suction pipe and variable valve means at the opposite end, the diameter of said suction pipe decreasing progressively from the suction means end to the variable valve means, and a plurality of tubular supports extending downwardly from said suction tube and disposed intermediate its ends, a plurality of downwardly flaring and opening suction hoods adjustably mounted on said tubular supports, a variable sleeve air valve at the intake end of the suction pipe, each of said tubular supports having a transverse aperture therein, a perforated sleeve on said tubular supports adapted to control said apertures, said apertures acting conjointly with the terminal air valve means of the suction tube, whereby to regulate the suction in each hood independently of the others.

5. An attachment for grain purifiers adapted to be secured to the purifier at one end, and including a suction means so secured, a suction pipe projecting from said suction means and extending over the purifier, a series of tubular supports opening out at opposite sides of said suction pipe in pairs extending downwardly, suction hoods comprising pipes and downwardly flaring and opening ends adapted to be closely adjacent, a variable air valve on said suction pipe, and variable air valves in said tubular supports adapted to cooperate with the air valve of the suction pipe and with each other, whereby to regulate the suction in each of the hoods.

THOMAS A. McWILLIAMS.
OMER C. PARMAN.
ALBERT R. OVERALL.